(12) United States Patent
Schueler (10) Patent No.: US 11,267,378 B2
(45) Date of Patent: Mar. 8, 2022

(54) CRASH-ARRESTING UNIT, IN PARTICULAR FOR A VEHICLE SEAT, AND VEHICLE SEAT

(71) Applicant: ADIENT ENGINEERING AND IP GMBH, Burscheid (DE)

(72) Inventor: Rolf Schueler, Heiligenhaus (DE)

(73) Assignee: Keiper Seating Mechanisms Co., Ltd., Shanghai (CN)

( * ) Notice: Subject to any disclaimer, the term of this patent is extended or adjusted under 35 U.S.C. 154(b) by 43 days.

(21) Appl. No.: 16/955,840

(22) PCT Filed: Dec. 10, 2018

(86) PCT No.: PCT/EP2018/084090
§ 371 (c)(1),
(2) Date: Jun. 19, 2020

(87) PCT Pub. No.: WO2019/121082
PCT Pub. Date: Jun. 27, 2019

(65) Prior Publication Data
US 2020/0339017 A1    Oct. 29, 2020

(30) Foreign Application Priority Data

Dec. 21, 2017  (DE) ...................... 10 2017 223 611.6
May  4, 2018   (DE) ...................... 10 2018 110 683.1

(51) Int. Cl.
*B60N 2/42*    (2006.01)
*B60N 2/16*    (2006.01)
*B60R 21/017*  (2006.01)

(52) U.S. Cl.
CPC ............... *B60N 2/43* (2013.01); *B60N 2/161* (2013.01); *B60R 21/017* (2013.01)

(58) Field of Classification Search
CPC .......... B60N 2/42; B60N 2/4221; B60N 2/43; B60N 2/427; B60N 2/42727;
(Continued)

(56) References Cited

U.S. PATENT DOCUMENTS

| | | |
|---|---|---|
| 7,044,543 B2 | 5/2006 | Schumann et al. |
| 7,438,357 B2 | 10/2008 | Becker et al. |
| 10,518,668 B2 | 12/2019 | Schueler |

FOREIGN PATENT DOCUMENTS

| | | | |
|---|---|---|---|
| DE | 3238682 A1 * | 4/1984 | ............. F23N 3/047 |
| DE | 10056082 B4 | 9/2004 | |

(Continued)

OTHER PUBLICATIONS

Machine translation DE 684 (Year: 2005).*
(Continued)

*Primary Examiner* — Hilary L Gutman
(74) *Attorney, Agent, or Firm* — Marshall & Melhorn, LLC (57) ABSTRACT

A crash-arresting unit for a vehicle seat may have a locking element and an actuating unit. The locking element can be brought into form-fitting engagement with a mating element via the actuating unit. The actuating unit may be an electromechanical actuating unit having a fusible wire, where destruction of the fusible wire frees a movement of the locking element in the direction of the mating element.

10 Claims, 7 Drawing Sheets

(58) Field of Classification Search
CPC .. B60N 2/42772; B60N 2/4279; B60N 2/161; B60R 21/017
USPC ........................................................ 296/68.1
See application file for complete search history.

(56) References Cited

FOREIGN PATENT DOCUMENTS

| | | | |
|---|---|---|---|
| DE | 102005004684 A1 | 9/2005 | |
| DE | 102008020992 A1 | 6/2009 | |
| DE | 102012105518 A1 * | 1/2014 | ............. B60N 2/888 |
| DE | 102015221563 A1 | 1/2017 | |
| WO | WO 2004/074037 A1 | 9/2004 | |
| WO | WO 2017001206 A1 | 1/2017 | |

OTHER PUBLICATIONS

European Patent Office, International Search Report with Written Opinion, dated Apr. 2, 2019, 13 pages, issued in PCT/EP2018/084090, European Patent Office, Rijswijk, Netherlands.

* cited by examiner

CRASH-ARRESTING UNIT, IN PARTICULAR FOR A VEHICLE SEAT, AND VEHICLE SEAT

The invention relates to a crash-arresting unit, in particular for a vehicle seat, having a locking element and an actuating unit, wherein the locking element can be brought into form-fitting engagement with a mating element by means of the actuating unit. The invention additionally relates to a vehicle seat, in particular a motor vehicle seat, having at least one multi-bar linkage and a crash-arresting unit which, in the event of a crash, locks at least two transmission links of the multi-bar linkage with one another.

PRIOR ART

The prior art discloses height-adjustable vehicle seats in which a belt buckle is co-moving, that is to say participates in the movement of the height adjuster in order, for example, in the case of a belt retractor which is blocked because of an abrupt movement and subsequent electric adjustment of the seat height upward, to avoid an uncomfortably high force between belt and occupant. Since the belt buckle of the vehicle seat is generally arranged on the inner side of the vehicle (tunnel side), but the geared motor required for an electric adjustment can customarily not be placed on the tunnel side for construction space reasons, the force introduced into the height adjuster by the belt buckle is transmitted over the entire rigidity of a substructure of the vehicle seat from the tunnel side onto the outer side of the vehicle (sill side) and absorbed there by a geared motor which is configured to be self-locking. Owing to these spatial conditions and the rigidity of only a finite magnitude of the vehicle seat components located in the force flux, drawing an introduction of load via the belt into the belt buckle, a significant travel of the belt buckle is produced in the load direction, which travel, under some circumstances, results in an undesirably great movement of the occupant relative to the rest of the vehicle interior. In order to solve this problem, what are referred to as crash-arresting units are known from the prior art, said crash-arresting units being installed on the tunnel side of the seat, i.e. in the direct vicinity of the belt buckle, and, in the event of loading of the belt buckle, providing an additional stiff connection within height adjuster kinematics. Said crash-arresting units generally block the rotational movement between a seat rail and a rear rocker, coupled to the seat rail, of the height adjuster kinematics.

A corresponding crash-arresting unit is known from WO 2004/074037 A1. An insertion movement, which is forced kinematically under a crash loading, of a pawl coupled to a rear rocker into the toothing of a toothed segment connected to the seat rail causes a blocking of the rotational movement between the rear rocker and the seat rail as a function of the load. Although the crash-arresting units according to WO 2004/074037 A1 significantly reduce the travel occurring upon loading of the belt buckle with a high force, in the event of particularly soft seat substructures a necessary deformation of the vehicle seat that is required for triggering the crash-arresting unit can be quite high, particularly since the loadings which occur in normal driving operation can lead to elastic deformations which, however, are not yet intended to allow the crash-arresting unit to be triggered. In order to suppress triggering under use loads, the triggering threshold of the crash-arresting unit has to be selected to be appropriately high, but this results in a later engagement in the event of a crash and therefore in an undesirably large relative movement of the belt buckle.

DE 100 56 082 B4 discloses a solution in which a system which blocks as a function of deceleration can be additionally activated as a function of load. A belt connection point is mounted movably, and a relative movement, which arises under loading, between the belt connection point and a seat frame is transmitted by means of a cable to a catch fixed on the seat rail.

WO 2017/001206 A1 discloses a vehicle seat having a multi-bar linkage for adjusting the seat height that is defined by five transmission links, wherein, in normal operation of the vehicle seat, the multi-bar linkage is operative as a four-bar linkage on account of a locking unit which acts between two transmission links, and a crash-arresting unit which, in the event of a crash, locks a vehicle structure-fixed frame and a rocker as two of the five transmission links with one another in such a way that the multi-bar linkage acts as a three-bar linkage, wherein a further transmission link of the five transmission links is arranged between the frame and the rocker, and wherein, in the event of a crash, the multi-bar linkage can initially act as a five-bar linkage on account of a load-controlled unlocking of the locking unit, with the result that locking of the crash-arresting unit can be triggered. The crash-arresting unit can be locked by an inertia-controlled pawl of the crash-arresting unit independently of a load-controlled unlocking of the locking unit.

DE 10 2005 004 684 A1 discloses a headrest of a motor vehicle seat having a supporting body which is normally situated in a use position and which, in the event of an accident, leaves the use position and assumes an accident position in which the supporting body is situated ahead of the use position in the direction of travel. A spring elastically preloads the supporting body in the direction of the accident position. A triggerable blocking device is assigned to the spring. The spring is normally blocked by means of the blocking device. In the event of an accident of the motor vehicle, the triggerable blocking device releases the elastic means, which can then move the supporting body from the use position into the accident position. The blocking device can be triggered by a crash sensor. The blocking device disclosed is a fusible wire which is destroyed by an electrical impulse such that the spring can move the supporting body from the use position into the accident position.

Object

The object on which the invention is based is to improve a crash-arresting unit of the type stated at the outset. The object on which the invention is based is in particular to equip a vehicle seat with a rapid-response crash-arresting unit, in particular to equip a vehicle seat known from WO 2017/001206 A1 with a rapid-response crash-arresting unit.

Solution

This object is achieved according to the invention by a crash-arresting unit, in particular for a vehicle seat, having a locking element and an actuating unit, wherein the locking element can be brought into form-fitting engagement with a mating element by means of the actuating unit, wherein the actuating unit is an electromechanical actuating unit having a fusible wire, wherein destruction of the fusible wire frees a movement of the locking element in the direction of the mating element.

By virtue of the fact that the actuating unit is an electromechanical actuating unit having a fusible wire, wherein destruction of the fusible wire frees a movement of the locking element in the direction of the mating element, locking of the crash-arresting unit by energizing the actuating unit is possible at any time and independently of accelerations occurring during a crash (accident). The fusible wire can preferably be destroyed by a current surge.

The locking element is preferably a pawl. The pawl can have a toothing region with a toothing. The mating element is preferably a toothed segment. The toothed segment can have a toothed segment region with a mating toothing, wherein the mating toothing can be brought into toothed engagement with the toothing of the pawl.

A spring, in particular a compression spring or a leg spring, can be held in a preloaded state in the preloaded position by the fusible wire. The fusible wire and the spring can be constituent parts of the electromechanical actuating unit. As soon as the fusible wire is destroyed, the spring can actuate an actuating rod, and the actuating rod can act on the locking element in such a way that the locking element comes into engagement with the mating element. Alternatively, the spring can actuate an actuating cable. The actuating cable can act on the locking element in such a way that the locking element comes into engagement with the mating element as soon as the fusible wire is destroyed. A further exemplary embodiment provides for the spring to directly pivot the locking element in such a way that the locking element comes into engagement with the mating element as soon as the fusible wire is destroyed.

The object is additionally achieved by means of a vehicle seat, in particular a motor vehicle seat, having at least one multi-bar linkage for adjusting the seat height, and a crash-arresting unit according to the invention which, in the event of a crash, locks at least two transmission members of the multi-bar linkage, in particular a frame, which can be connected to a vehicle structure, and a rocker of the multi-bar linkage, with one another.

The multi-bar linkage of the vehicle seat can be defined by at least five transmission members. In normal operation of the vehicle seat, the multi-bar linkage can be operative as a four-bar linkage on account of a locking unit which acts between at least two transmission links of the at least five transmission links. In the event of a crash, a crash-arresting unit can lock at least one frame, which can be connected to the vehicle structure, and a rocker as two of the at least five transmission links with one another in such a way that the multi-bar linkage acts as a three-bar linkage, wherein a further transmission link of the at least five transmission links is arranged between the frame and the rocker, and wherein, in the event of a crash, the multi-bar linkage can initially act as a five-bar linkage on account of a load-controlled unlocking of the locking unit, with the result that locking of the crash-arresting unit can be triggered. The crash-arresting unit can be locked by means of the electromechanical actuating unit according to the invention independently of the load-controlled unlocking of the locking unit.

The crash-arresting unit can be locked by an inertia-controlled pawl independently of the load-controlled unlocking of the locking unit and independently of the electromechanical actuating unit.

By virtue of the fact that the crash-arresting unit can be locked independently of a load-controlled unlocking of the locking unit by an inertia-controlled pawl of the crash-arresting unit, the crash-arresting unit can be activated in three different ways, namely not only as a function of load but also inertia-controlled and also by energizing the actuating unit of the crash-arresting unit. The vehicle seat known from WO 2017/001206 A1 can thus obtain additional locking which is precrash-capable, that is to say can be actuated already before a crash.

It is preferable, in the event of a crash, for the multi-bar linkage to become a rigid three-bar linkage by means of an inertia-controlled pawl of the crash-arresting unit without the multi-bar linkage becoming a five-bar linkage beforehand. In this way, the crash-arresting unit can already lock at the start of a frontal crash, even before the belt forces can trigger a load-controlled locking.

For a load-controlled locking of the crash-arresting unit, the multi-bar linkage preferably has a control rocker and a carrier rocker which, in the normal case, are locked with one another by means of a locking unit, with the result that the multi-bar linkage designed as a five-bar linkage acts, when considered kinematically, as a four-bar linkage. The locking unit holds the control rocker and a carrier rocker locked in the event of a frontal crash until a limit force acting on the vehicle seat is exceeded. If the limit force is exceeded, the locking unit opens, and the multi-bar linkage temporarily acts as a five-bar linkage. The control rocker and the carrier rocker must rotate relative to one another until the pawl becomes operative and locks the multi-bar linkage to form a three-bar linkage. The rocker which can be locked by the locking unit with the frame, which can be connected to the vehicle structure, so as to form a three-bar linkage is preferably the carrier rocker. A carrier rocker is to be understood to mean a rocker which carries a further component, in particular carries a pawl which is arranged in particular between two outer hinge points of the rocker.

In the event of a crash, the pawl is preferably inserted into a toothed segment, resulting in the three-bar linkage. The toothed segment can be fastened to a frame, for example to an upper rail of a seat rail pair serving as a longitudinal adjuster. The pawl can be pivotably mounted on the carrier rocker, in particular by means of a pawl bearing pin. The pawl can be rotatably mounted about a pawl axis of rotation. The pawl can be rotatably mounted on the carrier rocker about a pawl axis of rotation.

The pawl can additionally be inertia-controlled such that the pawl of the crash-arresting unit can also lock with the toothed segment as a result of inertia forces without for this purpose the control rocker and the carrier rocker having to rotate relative to one another. The locking unit which acts between control rocker and carrier rocker can remain locked during the inertia-controlled locking of the pawl.

The mass center of gravity of the pawl is preferably arranged eccentrically to a pawl axis of rotation of the pawl. For this purpose, the pawl can have an additional mass, in particular by comparison with pawls for crash-arresting units that are known from the prior art. The additional mass can be fastened to the pawl. The additional mass can be formed in one piece with the pawl.

The control rocker preferably has a journal which can control a rotation of the pawl relative to the carrier rocker in dependence on a relative angle between the control rocker and the carrier rocker. For this purpose, the pawl preferably has an opening or a depression, in particular a control groove, in which the journal engages. In at least one direction of rotation of the pawl, the journal can engage with a decoupling play in the opening or depression. With the locking unit unlocked and with a rotation of the carrier rocker relative to the control rocker in at least one direction of rotation, the journal can bring about a toothed engagement of the pawl with the toothed segment. In an opposite direction of rotation of the pawl, which leads in particular to a toothed engagement between a toothing region of the pawl and a toothed segment region of the toothed segment, the pawl is preferably decoupled from the journal. As a result, the pawl can lock in an inertia-controlled manner. The journal can be set out of the control rocker in one piece. The journal can be fastened, in particular riveted, to the control rocker. The control journal can be a pin. The control journal can bear a bush, in particular a plastic bush, which is arranged between the journal and the pawl and thus in particular avoids noise formation.

The pawl can be arranged axially between the rocker and a reinforcing plate. The reinforcing plate can be fixedly connected to the carrier rocker, for example by means of a spacer piece or spacer ring. The strength of the crash-arresting unit can be increased as a result.

It can be expressed in summary that the invention makes available a crash arrester (crash-arresting unit) for the locking of height adjusters, seatback adjusters, etc., which can lock not only as a result of an occurring acceleration and/or as a result of introduced loads, but can also lock by means of an electromechanical actuating unit. The invention thus achieves the object of temporally optimizing the locking process in that an active locking of the crash-arresting unit occurs by means of an electrical signal generated by the vehicle already before the actual acceleration.

The object is achieved in that the blocking element is accelerated by a mechanical spring in the locking direction, but this spring is held in the preloaded state in the preloaded position by a wire until a current surge causes this wire, like a customary fusible wire fuse, to glow and melt through within a short time. Immediately after the wire has melted through, the spring is thus no longer blocked and the stored energy leads to abrupt locking of the crash arrester.

The basis for the vehicle seat according to the invention is the vehicle seat which is described in WO 2017/001206 A1 and which is widened according to the invention by an additional, electrical activation possibility of the crash-arresting unit. For this purpose, the pawl is loaded by a spring which, in normal operation, is held with preloading by a metal wire (fusible wire) arranged in parallel. There is preferably a minimum distance between pawl and spring such that the spring force contacts the pawl and thus accelerates it in a locking manner only after the fusible wire has melted through. The spring is preferably designed in such a way that, even in the completely locked state, an appreciable locking-action force is still exerted in order, under unfavorable marginal conditions (head-on-head position of the toothings of toothed segment and pawl or dynamic rebounding of the pawl), to nevertheless reliably ensure locking within a short time or after a small relative movement between toothed segment and pawl. Absolute geometric locking reliability can be achieved in that a further pawl, offset by half a tooth pitch, with a dedicated, second activator or an activator having two separate drive springs, but a common fusible wire, is used such that at least one of the pawls is always brought into sufficient overlap. The actual embodiment of the "fusible wire activator" (actuating unit) can be embodied as a tension, compression or leg spring, with the crucial thing ultimately being the feature of the metallic wire which acts directly or indirectly between the spring ends and which holds the spring in the preloaded state as long as the wire has not melted through. Such actuators with fusible wire are generally known or mentioned in the patent literature, for example in DE 10 2005 004 684 A1 in relation to crash-active headrests. By contrast with crash-active headrests which already react under very small collisions and are therefore intended to be reversible, the activation of a seat structure-integrated crash-arresting unit occurs only for example together with or shortly before an airbag activation, necessarily resulting in a considerable repair outlay on the vehicle and on the vehicle seat and possibly requiring the latter to be replaced. The other actuator embodiments (electromagnets, etc.) used in headrests on account of the reversibility are in total heavier and/or more complicated than the combination of spring and wire proposed here; nevertheless, a melting wire actuator can also be presented in a structural embodiment which can, where appropriate, be replaced by a new activator following a crash. A structural configuration as a functional unit protected in a housing is generally to be preferred in order to avoid erroneous triggerings due to damage from outside and functional impairments due to contamination.

FIGURES AND EMBODIMENTS OF THE INVENTION

The invention is explained in more detail below on the basis of three exemplary embodiments known from the prior art and three exemplary embodiments according to the invention. However, the invention is not limited to these exemplary embodiments. In the figures.

Figure 1:
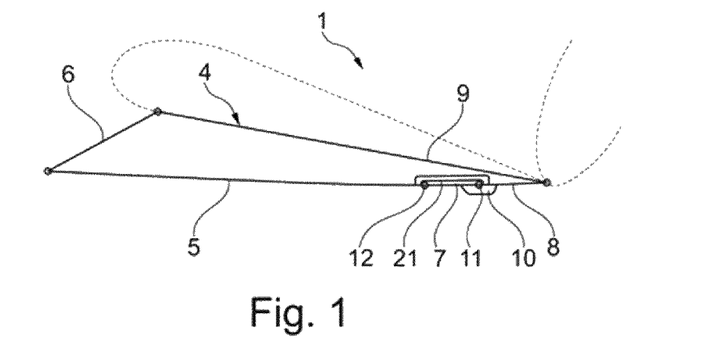
FIG. 1: shows a schematic basic diagram of a first exemplary embodiment of a vehicle seat known from the prior art having a crash-arresting unit.
Figure 2:
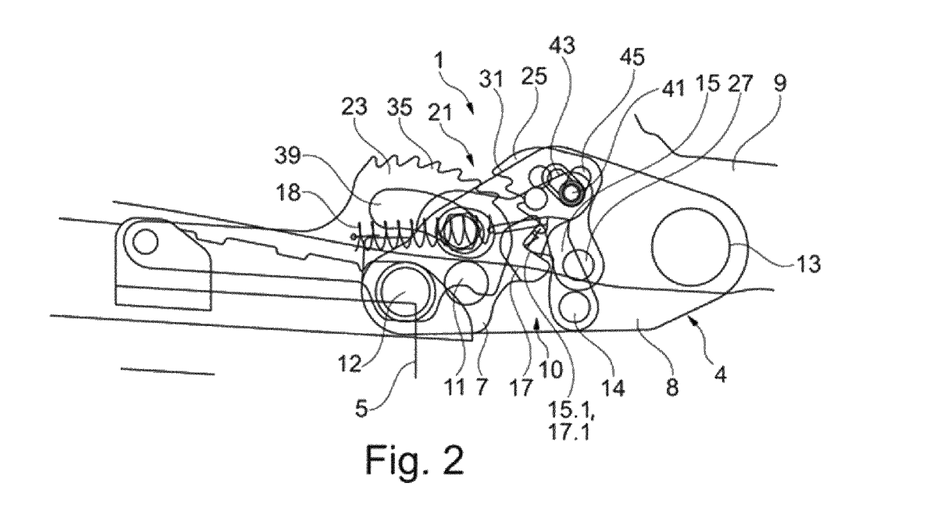
FIG. 2: shows a schematic illustration of the first exemplary embodiment of the vehicle seat known from the prior art in the region of a crash-arresting unit, in a nonactivated state of the crash-arresting unit.
Figure 3:
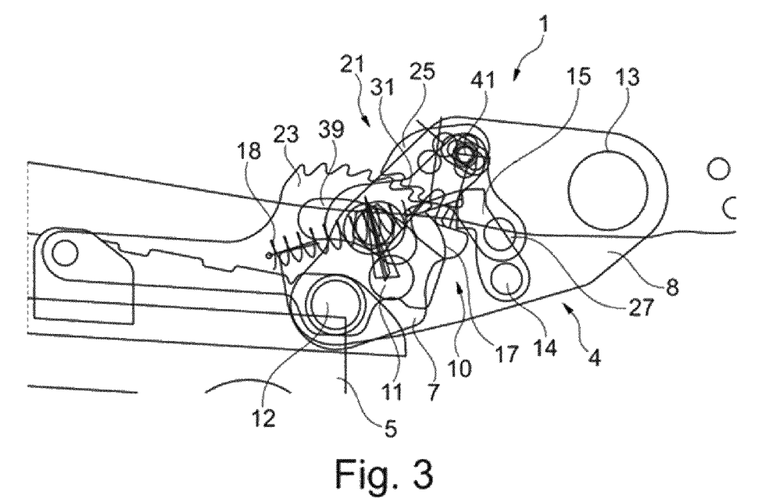
FIG. 3: shows an illustration corresponding to FIG. 2 during the locking of the crash-arresting unit.

FIGS. 1 to 3 schematically illustrate a first exemplary embodiment of a vehicle seat 1, as is known from the prior art and largely corresponds to a vehicle seat known from WO 2004/074037 A1.

The vehicle seat 1 is height-adjustable and provided for a motor vehicle. Multi-bar linkages serve as height adjuster on both vehicle seat sides, with the vehicle seat 1 in the exemplary embodiment being a front seat which, as viewed in the direction of travel, can be installed for example on the left vehicle side of a left-hand drive motor vehicle as driver's seat. On the left side of the vehicle seat 1 (the side of the vehicle seat 1 that faces the sill side of the motor vehicle) there is provided a motor-movable four-bar linkage and, on the right side (tunnel side), a multi-bar linkage 4 which is operative as a four-bar linkage in the normal case, that is to say outside of a crash situation, and which has dimensions corresponding to the motor-driven four-bar linkage. On the right side, the vehicle seat 1 has a co-moving belt buckle. Co-moving means in the present case that, with a height adjustment of the vehicle seat 1, the belt buckle is also correspondingly moved in height by means of the height adjuster, with the result that, in the event of a crash, belt forces have to be channeled via the height adjuster.

The multi-bar linkage 4 consists of five transmission links, namely a frame 5 which can be connected to a vehicle structure, in the present case an upper rail of a seat rail pair serving as a longitudinal adjuster, a front rocker 6 articulated on the frame 5, a control rocker 7 articulated on the frame 5 at the rear, a carrier rocker 8 articulated on the control rocker 7, and a coupler 9 articulated on the front rocker 6 and the carrier rocker 8, in the present case a seat frame side part to which the belt buckle is also preferably fastened. In the normal case, the control rocker 7 is here rigidly connected to the carrier rocker 8 by a locking unit 10 which will be described below. The multi-bar linkage 4 is thus a five-bar linkage, but which, as a result of the locking between control rocker 7 and carrier rocker 8, acts as a four-bar linkage in the normal case. The carrier rocker 8 is articulated on the control rocker 7 by means of a connecting pin 11, the articulation of the control rocker 7 on the frame 5 is effected by means of a hinge pin 12, and a round transverse tube 13 serves as articulation point between the carrier rocker 8 and the coupler 9 and simultaneously forms a part of the seat frame. The carrier rocker 8 encloses the hinge pin 12 with play by way of an oblong hole (not illustrated in further detail).

The locking unit 10 for the rigid connection, which is present in the normal case, between the control rocker 7 and the carrier rocker 8 has, on the carrier rocker 8, in a region behind the connecting pin 11, a locking bar 15 which is articulated by means of a locking bar bearing pin 14 and which engages in a mating piece 17 which is rigidly connected to the control rocker 7. Here, the locking bar 15 has a functional surface 15.1 which becomes relevant in a frontal crash. A spring 18 designed as a tension spring is suspended between the locking bar 15 and an angled portion of the carrier rocker 8 that is provided ahead of the connecting pin 11. The spring 18 preloads the locking bar 15 which engages in the mating piece 17, with the angles between the functional surface 15.1 and a corresponding bearing surface 17.1 of the mating piece 17 lying outside the self-locking region. Here, the preloading of the spring 18 defines a limit force up to which the locking unit 10 holds in a force-fitting manner in a frontal crash, that is to say the control rocker 7 and the carrier rocker 8 are rigidly connected to one another.

A crash-arresting unit 21 of the five-bar linkage 4, which unit locks in a frontal crash, has a toothed segment 23, which is mounted on the frame 5, and a pawl 25 which is mounted on the carrier rocker 8 so as to be pivotable about a pawl axis of rotation 26 by means of a pawl bearing pin 27. The approximately vertically arranged pawl 25 of two-arm design has a toothing region 31.

The toothed segment 23, which is curved around the hinge pin 12 and which is arranged at a small distance from the pawl 25, is provided as a mating element for the pawl 25. The toothed segment 23 likewise has a region of teeth, namely a toothed segment region 35 which is designed to interact with the toothing region 31 of the pawl 25, that is to say is provided with correspondingly formed teeth.

During a pivoting movement of the control rocker 7 and of the carrier rocker 8, which is locked thereto, about the hinge pin 12, as occurrs during a height adjustment of the vehicle seat 1, the toothing region 31 of the pawl 25 migrates along the toothed segment region 35. In order to be able to ensure an interaction at each adjustment of the five-bar linkage 4, the toothed segment region 35 is designed to be longer than the corresponding toothing region 31. To improve the guidance, the connecting pin 11 projects through a guide slot 39 of the toothed segment 23, said slot being curved about the hinge pin 12.

In order to achieve coupling between the pawl 25 and the control rocker 7, a journal 41 projects on the upper end, remote from the hinge pin 12, of the control rocker 7 parallel to the hinge pin 12 and engages through an oblong hole 43 in the carrier rocker 8, and the other end of said journal is guided into a control groove 45 of the pawl 25. The oblong hole 43 allows the movability of the journal 41 that is necessary for the described functioning capability of the pawl 45.

In the event of a frontal crash, a torque which attempts to raise the multi-bar linkage 4 acts as a result of the force acting on the belt buckle and of the blocking of the motor-driven four-bar linkage on the other vehicle seat side via the transverse tube 13. This torque generates a countertorque on the hinge pin 12, which attempts to rotate the control rocker 7 relative to the carrier rocker 8. At first, the spring 18 still holds the locking bar 15 in the mating piece 17, with the functional surface 15.1 attempting to pass out of the mating piece 17. As soon as the limit force is exceeded, the locking bar 15 comes free, with the result that the locking unit 10 opens and the rigid connection between the control rocker 7 and the carrier rocker 8 is canceled. The multi-bar linkage 4 is now a genuine five-bar linkage which undergoes a small change in geometry as a result of the pivoting movement between carrier rocker 8 and control rocker 7.

This pivoting movement has the effect, via the coupling with the journal 41, that the pawl 25 is pivoted, which leads to a forcibly controlled meshing of the pawl 25 in the toothed segment 23. As a result, the carrier rocker 8 is locked with the frame 5 by the crash-arresting unit 21, by bridging the control rocker 7, that is to say that the multi-bar linkage 4 which becomes a rigid three-bar linkage is blocked, and the entire system becomes stiffer. The crash loads can thus be channeled directly into the vehicle structure and thus produce only a small deformation in the seat structure. As a result of the small change in geometry, a belt connection point or belt buckle connection point provided in the region of the coupler 9 is only slightly shifted forward.

Figure 4:
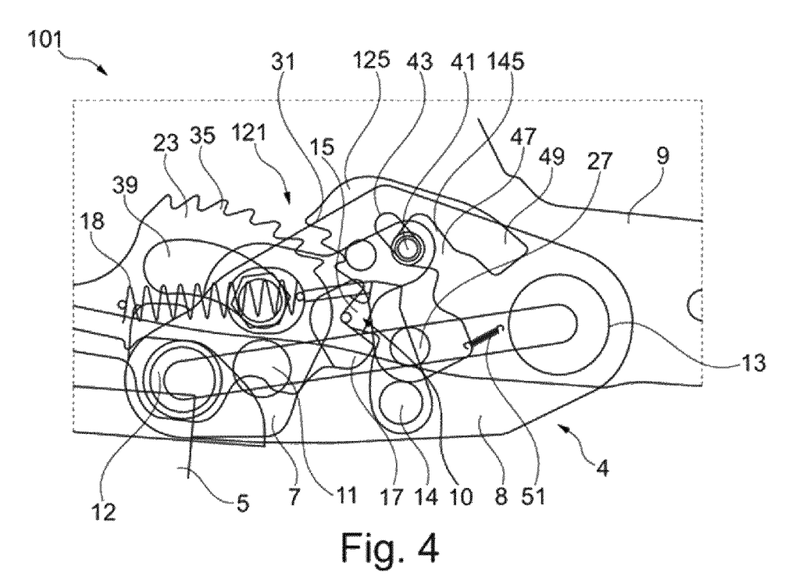
FIG. 4: shows a schematic illustration of a second exemplary embodiment of a vehicle seat known from the prior art in the region of a crash-arresting unit, in a nonactivated state of the crash-arresting unit.
Figure 5:
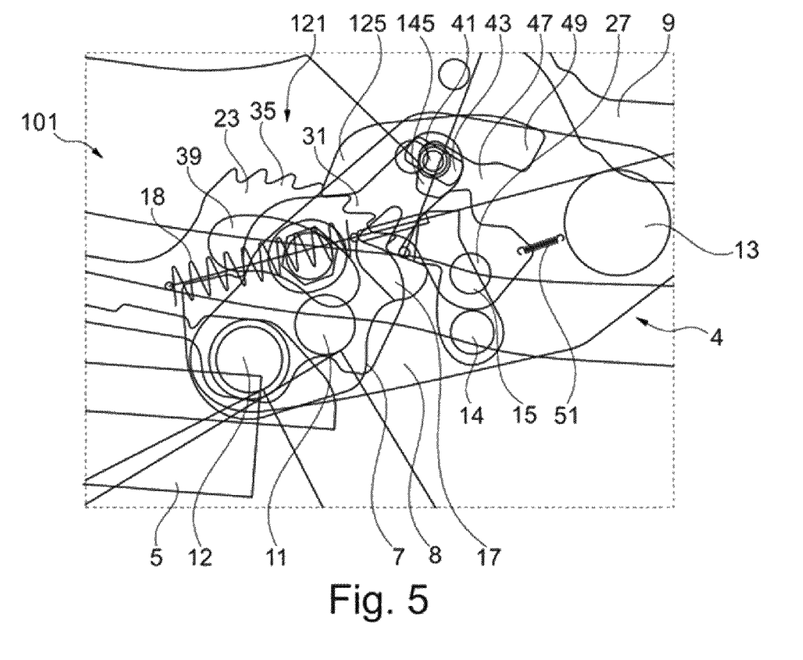
FIG. 5: shows an illustration corresponding to FIG. 4, where the crash-arresting unit is completely locked.
Figure 6:
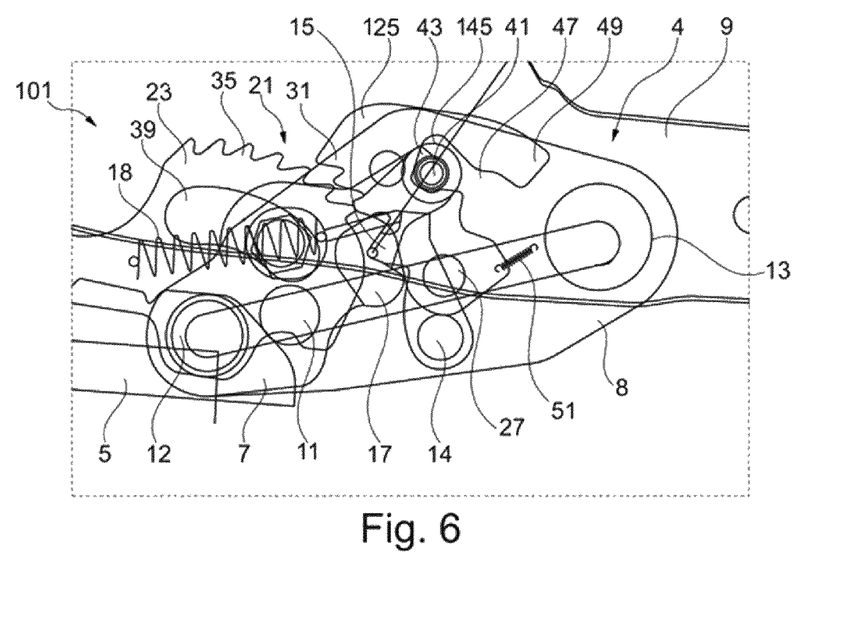
FIG. 6: shows an illustration corresponding to FIG. 4 during the locking of the crash-arresting unit.

FIGS. 4 to 6 show a detail of a second exemplary embodiment of a vehicle seat 101 which is known from the prior art and which, apart from the components and functions described differently below, corresponds to the first exemplary embodiment known from the prior art that is described above with reference to FIGS. 1 to 3. Identical or identically acting components therefore bear the same reference signs.

A crash-arresting unit 121 of the five-bar linkage 4, which unit is locked in a frontal crash, has a toothed segment 23, which is mounted on the frame 5, and a pawl 125 which is mounted on the carrier rocker 8 so as to be pivotable about a pawl axis of rotation 26 by means of a pawl bearing pin 27. The pawl 125 has a toothing region 31.

The pawl 125, which is designed differently in relation to the first exemplary embodiment of the prior art, has a control groove 145 in which the journal 41 engages. The control groove 145 is opened by an opening 47 in a direction facing away from the toothing region 31. By contrast with the above-described first exemplary embodiment, the pawl 125 is thus movable to a limited degree relative to the journal 41. A compression spring 51 preloads the pawl 125 in a direction of rotation in such a way that the toothing region 31 of the pawl 125 rotates away from the toothed segment region 35 of the toothed segment 23 until a boundary wall, which is opposite the toothing region 31, of the control groove 145 bears against the journal 41. This situation corresponds to the normal case.

During a frontal crash, the pawl 125 pivots in the direction of meshing between the toothing region 31 of the pawl 125 and the toothed segment region 35 of the toothed segment 23 as a result of inertia forces of the pawl 125 and under preloading of the compression spring 51. In the process, the journal 41 is released from the boundary wall of the control groove 145. The inertia forces of the pawl 125 are generated here by a center of gravity of the pawl 125 that is arranged eccentrically to the pawl bearing pin 27. To increase the eccentricity between the pawl bearing pin 27 and the center of gravity of the pawl 125, the pawl has an additional mass 49 which is arranged radially on the outside with respect to the pawl bearing pin 27 and facing away from the toothing region 31. In the present case, the additional mass 49 is configured in one piece with the pawl 125.

FIG. 4 shows the crash-arresting unit 121 in a normal case in which the pawl 125 and the toothed segment 23 are not meshing. There are two possibilities of how the pawl 125 can enter into meshing engagement with the toothed segment 23 during a frontal crash. The first possibility corresponds to the locking which is comprehensively described above with reference to FIGS. 1 to 3, is known from the prior art (first exemplary embodiment) and occurs as a result of a force acting on the belt buckle in the event of a frontal crash. The second possibility is the locking by means of the inertia forces of the pawl 125. There are thus available two different technical operative principles for locking the crash-arresting unit 121. During a frontal crash, the inertia forces can already lock the pawl 125 in the time sequence before the forces on the belt buckle are of sufficient size to release the locking bar 15 from the mating piece 17 and, as a result, to ultimately pivot the pawl 125 by means of the journal 41.

FIG. 5 shows a locked state of the crash-arresting unit 121 in which the pawl 125 has completely locked with the toothed segment 23. Depending on the type and direction of the frontal crash, the sequence of movement can vary during the frontal crash: the toothing region of the pawl 125 can first of all in terms of time engage in the toothed segment region 35 of the toothed segment 23 as a result of the inertia forces and then the journal 41 can move. However, it is also possible for both operative principles to take place approximately at the same time.

FIG. 6 shows a further possible state during a frontal crash. The toothing region 31 of the pawl 125 is relative to the toothed segment region 35 of the toothed segment 23 in a position in which the tooth heads of the toothings land on one another and, as a result, meshing only because of the inertia forces is not possible. In this case, after a slight deformation of the vehicle seat 101 as a result of the belt forces and a resulting relative movement between pawl 125 and toothed segment 23, the journal 41 will bring the pawl 125 into complete meshing engagement with the toothed segment 23.

Figure 7:
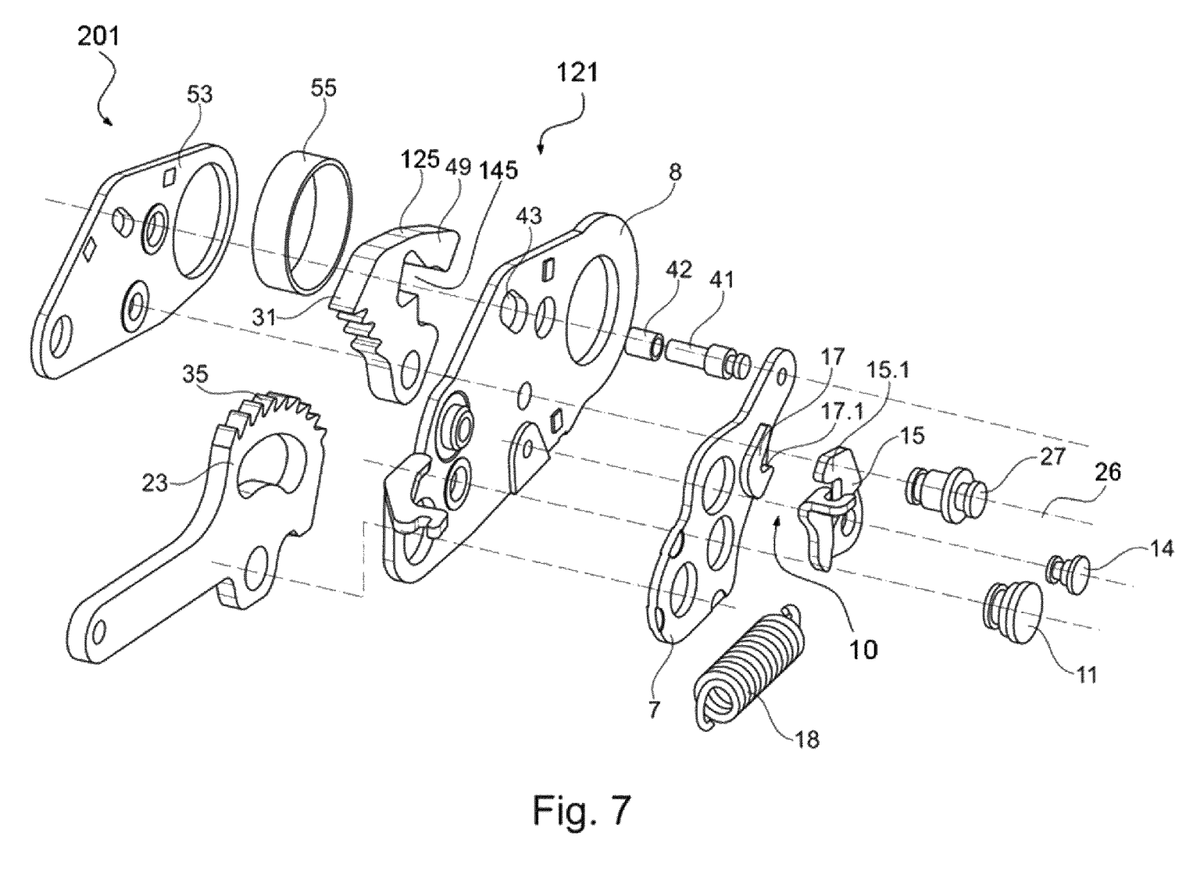
FIG. 7: shows a detail perspective exploded illustration of a third exemplary embodiment of a vehicle seat known from the prior art.

FIG. 7 shows a third exemplary embodiment of a vehicle seat 201 which is known from the prior art and which, apart from the components and functions described differently below, corresponds to the vehicle seat 101, which is described above with reference to FIGS. 4 to 6, of the second exemplary embodiment known from the prior art. In order to explain the identically acting components and the identical functions, reference is therefore made to the description of the second exemplary embodiment known from the prior art. In addition, identical or identically acting components bear the same reference signs as in the second exemplary embodiment known from the prior art.

A carrier rocker 8 of the vehicle seat 201 is reinforced by means of a reinforcing plate 53. The reinforcing plate 53 is arranged parallel to the carrier rocker 8. The reinforcing plate 53 is arranged spaced apart from the carrier rocker 8. A spacer ring 55 connects the carrier rocker 8 to the reinforcing plate 53. The spacer ring 55 is cylindrical. A center axis of the spacer ring runs parallel to the axis of rotation of the pawl 125. The carrier rocker 8 bears against a first end of the spacer ring 55 and is welded thereto. The reinforcing plate 53 bears against the other end of the spacer ring 55 and is welded thereto. The pawl 125 is arranged in the axial direction between the carrier rocker 8 and the reinforcing plate 53. In addition, the toothed segment 23 is arranged in the axial direction between the carrier rocker 8 and the reinforcing plate 53. The term axial relates to the pawl axis of rotation 26.

A journal 41 is a component formed separately from the control rocker 7. The journal 41 is riveted to the control rocker 7. The journal 41 bears a bush 42 which preferably consists of a plastic. A compression spring, not illustrated in FIG. 7, preloads the pawl 125 in a direction of rotation in such a way that a toothing region 31 of the pawl 125 rotates away from a toothed segment region 35 of a toothed segment 23 until a boundary wall, which is opposite the toothing region 31, of the control groove 145 of the pawl 125 bears against the bush 42 of the journal 41. This situation corresponds to the normal case. With respect to the sequences in the event of a frontal crash, the third exemplary embodiment corresponds with the second exemplary embodiment. In particular, the crash-arresting unit 121 can be locked by the inertia-controlled pawl 125 independently of a load-controlled unlocking of the locking unit 10.

Figure 8:
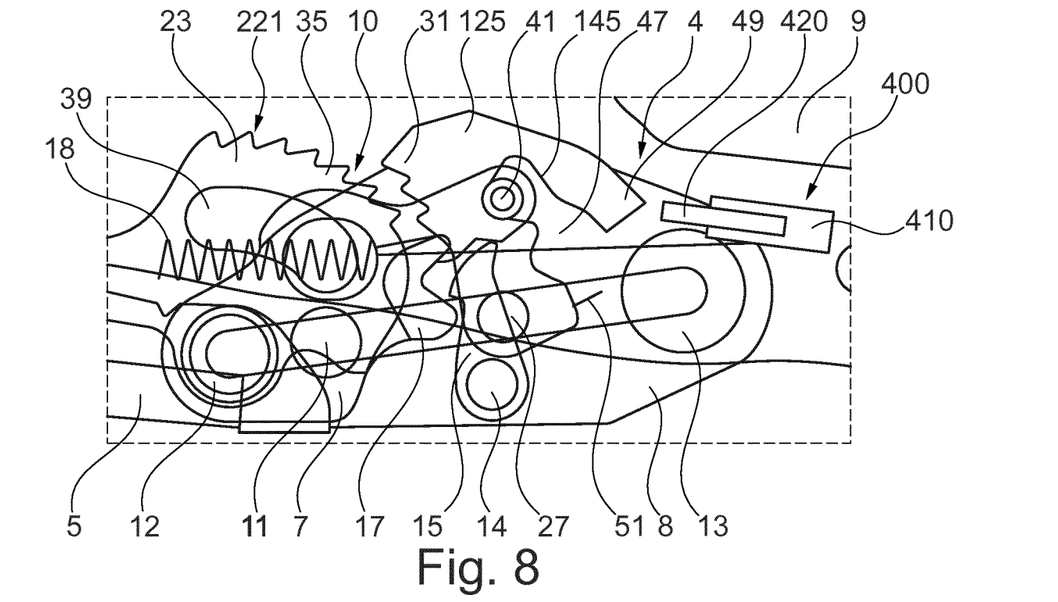
FIG. 8: shows a schematic illustration of a vehicle seat in the region of a crash-arresting unit according to the invention according to a first exemplary embodiment, in a nonactivated state of the crash-arresting unit.
Figure 9:
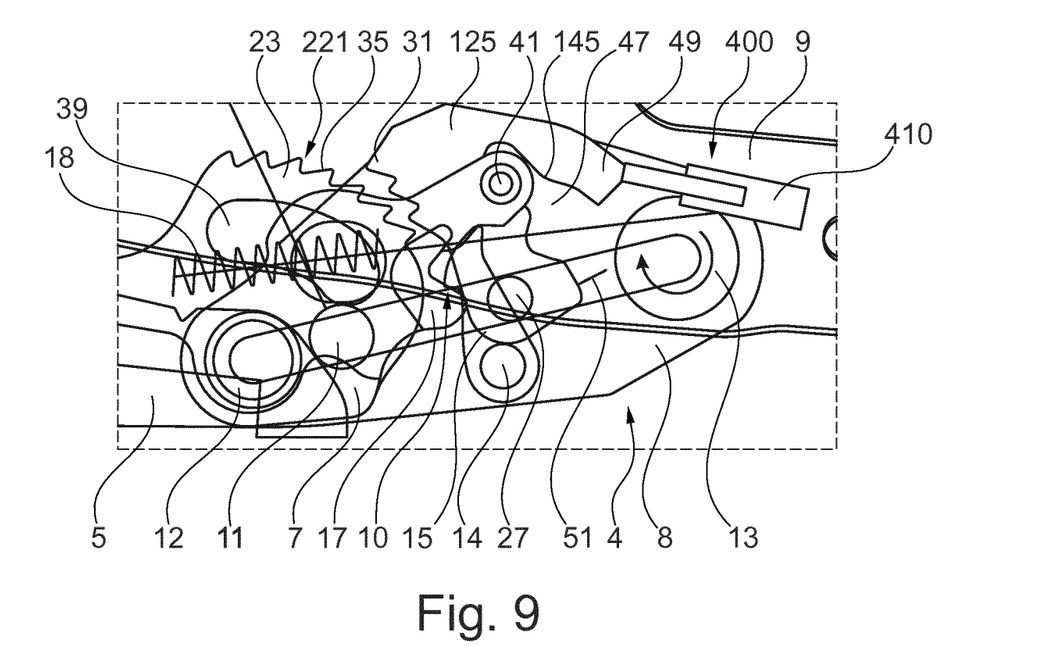
FIG. 9: shows an illustration corresponding to FIG. 8 during the locking of the crash-arresting unit.
Figure 10:
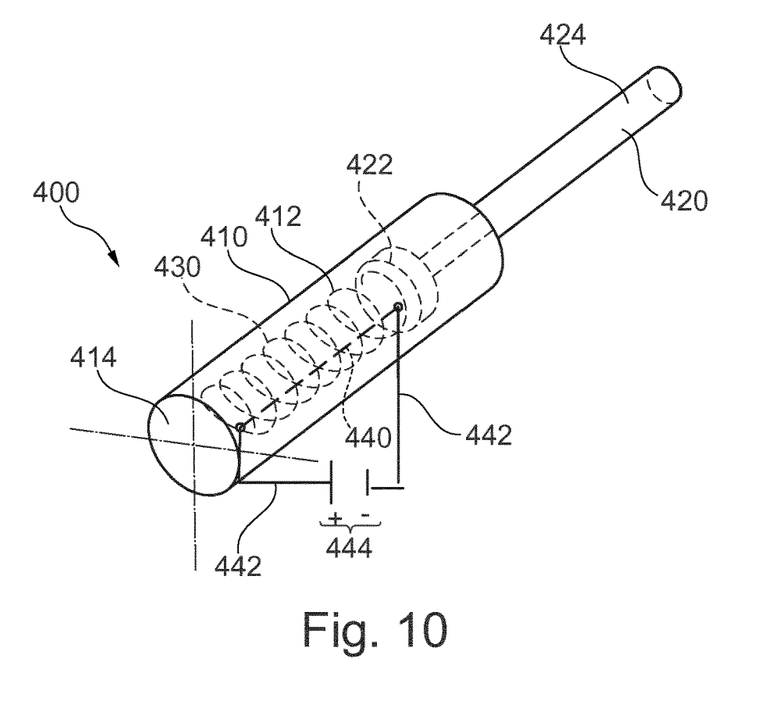
FIG. 10: shows a perspective and schematic illustration of an electromechanical actuating unit of the crash-arresting unit from FIG. 8, FIG. 11: shows a schematic illustration of an electromechanical actuating unit of a second exemplary embodiment of a crash-arresting unit according to the invention.

FIGS. 8 to 10 show a detail of a vehicle seat 301 having a crash-arresting unit 221 according to the invention according to a first exemplary embodiment. Apart from the components and functions described differently below, the vehicle seat 301 corresponds to the vehicle seat 101, which is described above with reference to FIGS. 4 to 6, of the second exemplary embodiment known from the prior art. For an explanation of the identically acting components and of the identical functions, reference is therefore made to the description of the second exemplary embodiment known from the prior art. In addition, identical or identically acting components bear the same reference signs as in the second exemplary embodiment known from the prior art.

As in the above-described crash-arresting unit 121 of the second exemplary embodiment known from the prior art, a locking of the crash-arresting unit 221 in the event of a crash can occur by means of an inertia-controlled pawl 125 of the crash-arresting unit 221 as a result of a load-controlled unlocking of a locking unit 10 or independently of a load-controlled unlocking of the locking unit 10. In addition, a locking of the crash-arresting unit 221 can occur in that, directly before or during a crash situation, the pawl 125 can be brought into meshing engagement with a toothed segment 23 fastened to the frame 5 by means of an electromechanical actuating unit 400.

The electromechanical actuating unit 400 has a housing 410, an actuating rod 420, a compression spring 430 and a fusible wire 440. The compression spring 430 is arranged preloaded between the housing 410 and the actuating rod 420 in such a way that, during a relaxation of the compression spring 430, the compression spring 430 moves the actuating rod 420 relative to the housing 410 and, as a result, the actuating rod 420 pivots the pawl 125 in the direction of the toothed segment 23. In normal use of the vehicle seat 301, the compression spring 430 is preloaded and secured against relaxation by means of the fusible wire 440.

The actuating rod 420 comprises a piston portion 422 and a rod portion 424. The piston portion 422 and the rod portion 424 are configured in one piece or fixedly connected to one another. The piston portion 422 is movably guided in a cylinder portion 412 of the housing 410. The compression spring 430 is arranged completely in the housing 410. A first spring end of the compression spring 430 is supported on an end face 414 of the housing 410. A second spring end of the compression spring 430 is supported on the piston portion 422. The fusible wire 440 connects the piston portion 422 to the housing 410, in the present case to the end face 412 of the housing 410. Alternatively, the fusible wire 440 connects individual turns of the compression spring 430 to one another in such a way that the compression spring 430 cannot relax.

In the event of a crash, the fusible wire 440 can be energized via two cables 442 and an electrical current source 444. The current strength and the voltage can be designed in a manner known per se in dependence in particular on the wire material, the wire diameter and a desired triggering time of the electromechanical actuating unit 400. With the energization of the fusible wire 440, the fusible wire 440 melts and the compression spring 430 can relax. As a result, the actuating rod 420 pivots the pawl 125 in the direction of the toothed segment 23 until the pawl 125 is completely locked with the toothed segment 23.

Figure 11:
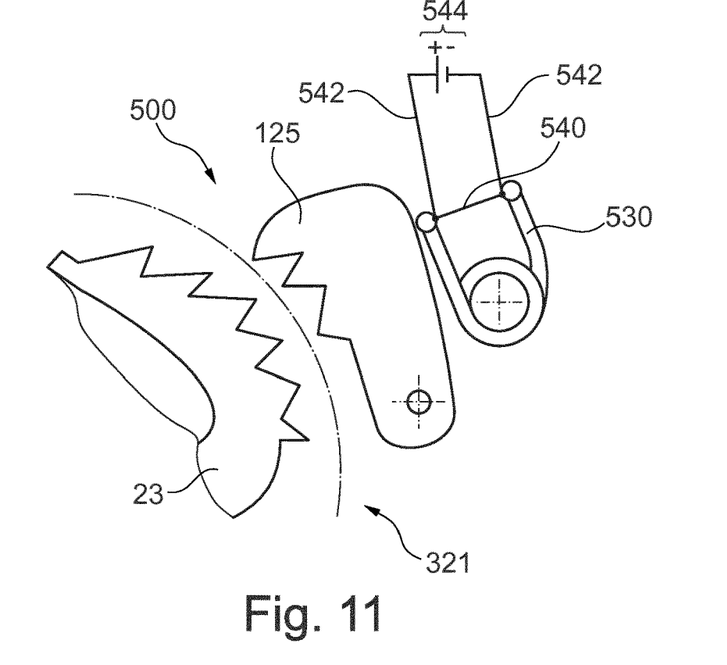

FIG. 11 shows an electromechanical actuating unit 500 of a crash-arresting unit 321 according to the invention according to a second exemplary embodiment. Apart from the components and functions which are described differently below, the crash-arresting unit 321 corresponds to the crash-arresting unit 221 of the first exemplary embodiment that is described above with reference to FIGS. 8 to 11. For an explanation of the identically acting components and of the same functions, reference is therefore made to the description of the second exemplary embodiment known from the prior art and of the first exemplary embodiment according to the invention. In addition, identical or identically acting components bear the same reference signs as in the second exemplary embodiment known from the prior art.

The electromechanical actuating unit 500 has a leg spring 530 and a fusible wire 540. The leg spring 530 is preloaded and secured against relaxation by means of the fusible wire 540.

In the event of a crash, the fusible wire 540 can be energized via two cables 542 and an electrical current source 544. With the energization of the fusible wire 540, the fusible wire 540 melts and the leg spring 530 can relax. As a result, the leg spring 530 pivots the pawl 125 in the direction of the toothed segment 23 until the pawl 125 locks completely with the toothed segment 23.

Figure 12:
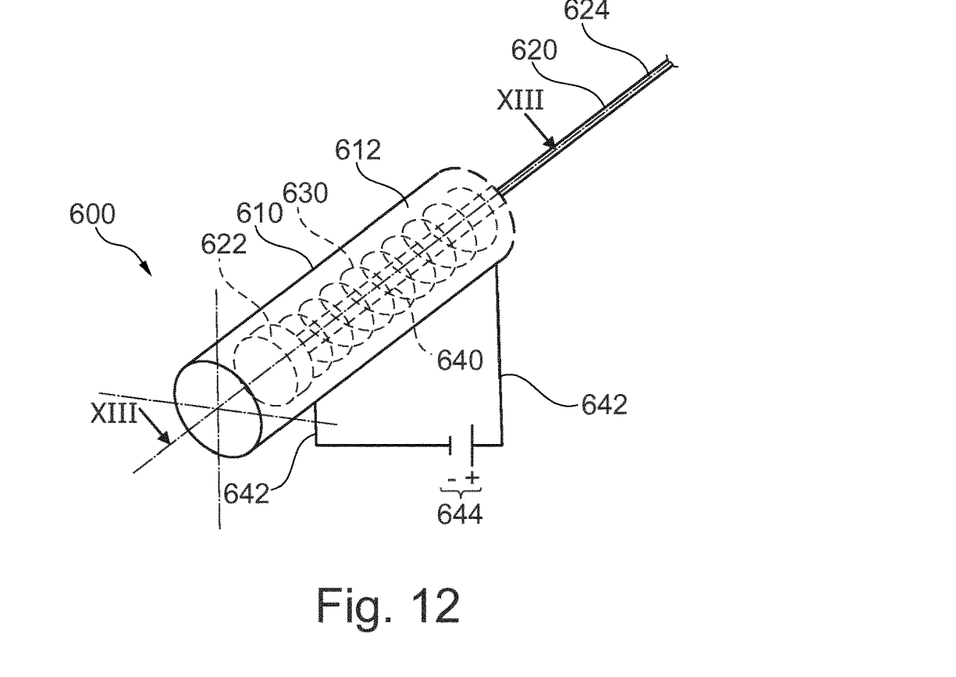
FIG. 12: shows a perspective and schematic illustration of an electromechanical actuating unit of a second exemplary embodiment of a crash-arresting unit according to the invention.
Figure 13:
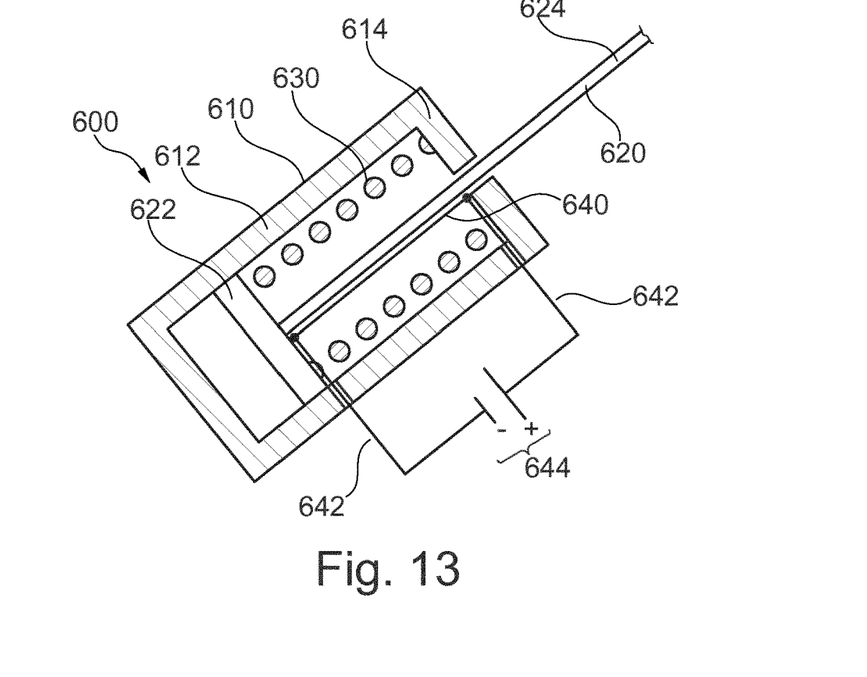
FIG. 13: shows a section along the line XIII-XIII in FIG. 12.

FIGS. 12 and 13 show an electromechanical actuating unit 600 of a crash-arresting unit according to the invention according to a third exemplary embodiment. Apart from the components and functions which are described differently below, the crash-arresting unit corresponds to the first crash-arresting unit 221 which is described above with reference to FIGS. 8 to 11. For an explanation of the identically acting components and of the same functions, reference is therefore made to the description of the second exemplary embodiment known from the prior art and of the first exemplary embodiment according to the invention. In addition, identical or identically acting components bear the same reference signs as in the second exemplary embodiment known from the prior art.

As in the above-described crash-arresting unit 121 of the second exemplary embodiment known from the prior art, a locking of the crash-arresting unit in the event of a crash can occur by means of an inertia-controlled pawl 125 of the crash-arresting unit as a result of a load-controlled unlocking of a locking unit 10 or independently of a load-controlled unlocking of the locking unit 10. In addition, a locking of the crash-arresting unit can occur in that, directly before or during a crash situation, the pawl 125 can be brought into meshing engagement with a toothed segment 23 fastened to the frame 5 by means of an electromechanical actuating unit 600.

The electromechanical actuating unit 600 has a housing 610, an actuating cable 620, a compression spring 630 and a fusible wire 640. The compression spring 630 is arranged preloaded between the housing 610 and the actuating cable 620 in such a way that, with a relaxation of the compression spring 630, the compression spring 630 moves the actuating cable 620 relative to the housing 610 and, as a result, the actuating cable 620 pulls the pawl 125 in the direction of the toothed segment 23. In normal use of the vehicle seat, the compression spring 630 is preloaded and secured against relaxation by means of the fusible wire 640.

The actuating cable 620 comprises a piston portion 622 and a cable portion 624. The cable portion 624 and the piston portion 622 are connected to one another. The piston portion 622 is movably guided in a cylinder portion 612 of the housing 610. The compression spring 630 is arranged completely in the housing 610. A first spring end of the compression spring 630 is supported on an end face 614 of the housing 610. A second spring end of the compression spring 630 is supported on the piston portion 622. The fusible wire 640 connects the piston portion 622 to the housing 610, in the present case to the end face 612 of the housing 610. Alternatively, the fusible wire 640 connects individual turns of the compression spring 630 to one another in such a way that the compression spring 630 cannot relax.

In the event of a crash, the fusible wire 640 can be energized via two cables 642 and an electrical current source 644. With the energization of the fusible wire 640, the fusible wire 640 melts and the compression spring 630 can relax. As a result, the actuating rod 620 pivots the pawl 125 in the direction of the toothed segment 23 until the pawl 125 locks completely with the toothed segment 23.

The features disclosed in the above description, the claims and the drawings may be of importance both individually and in combination for the realization of the invention in its various embodiments.

Although the invention has been described in detail in the drawings and the description above, what has been said and the illustrations should be understood as being illustrative and exemplary and not restrictive. In particular, the choice of the proportions of the individual elements illustrated in the drawings should not be interpreted as necessary or limiting. Furthermore, the invention is in particular not limited to the exemplary embodiments explained. Further variants of the invention and the implementation thereof are apparent to a person skilled in the art from the above disclosure, the figures and the claims.

LIST OF REFERENCE SIGNS 1, 101, 201, 301 Vehicle seat
4 Multi-bar linkage
5 Frame
6 Front rocker
7 Control rocker
8 Rocker, carrier rocker
9 Coupler
10 Locking unit
11 Connecting pin
12 Hinge pin
13 Transverse tube
14 Locking bar bearing pin
15 Locking bar
15.1 Functional surface
17 Mating piece
17.1 Bearing surface
18 Spring
21, 121, 221, 321 Crash-arresting unit
23 Toothed segment, mating element
25, 125 Pawl, locking element
26 Pawl axis of rotation
27 Pawl bearing pin
31 Toothing region
33 Center of gravity
35 Toothed segment region
39 Guide slot
41 Journal
42 Bush
43 Oblong hole
45, 145 Control groove
47 Opening
49 Additional mass
51 Compression spring
53 Reinforcing plate
55 Spacer ring
400, 500, 600 Actuating unit
410, 610 Housing
412, 612 Cylinder portion
414, 614 End face
420, 620 Actuating rod
422, 622 Piston portion
424, 624 Rod portion
430, 530, 630 Spring, compression spring
440, 540, 640 Fusible wire
442, 542, 642 Cable
444, 544, 644 Current source

The invention claimed is:

1. A crash-arresting unit for a vehicle seat, comprising:
a locking element and an actuating unit, wherein the locking element can be brought into form-fitting engagement with a mating element via the actuating unit,
wherein the actuating unit is an electromechanical actuating unit having a fusible wire, wherein destruction of the fusible wire pushes the locking element in the direction of the mating element.

2. The crash-arresting unit as claimed in claim 1, wherein the locking element is a pawl.

3. The crash-arresting unit as claimed in claim 1, wherein the mating element is a toothed segment.

4. The crash-arresting unit as claimed in claim 1, wherein the fusible wire can be destroyed by a current surge.

5. The crash-arresting unit as claimed in claim 1, wherein a spring in a preloaded state is held in the preloaded position by the fusible wire.

6. The crash-arresting unit as claimed in claim 5, wherein the spring is a compression spring.

7. The crash-arresting unit as claimed in claim 6, wherein the fusible wire and the spring are constituent parts of the electromechanical actuating unit.

8. The crash-arresting unit as claimed in claim 5, wherein the spring actuates an actuating rod, and the actuating rod acts on the locking element in such a way that the locking element comes into engagement with the mating element as soon as the fusible wire is destroyed.

9. The crash-arresting unit as claimed in claim 5, wherein the spring actuates an actuating cable as soon as the fusible wire is destroyed, and in that the actuating cable acts on the locking element in such a way that the locking element comes into engagement with the mating element.

10. The crash-arresting unit as claimed in claim 5, wherein the spring directly pivots the locking element in such a way that the locking element comes into engagement with the mating element as soon as the fusible wire is destroyed.

* * * * *